United States Patent [19]
Bramley et al.

[11] 3,983,280
[45] Sept. 28, 1976

[54] NETTING

[76] Inventors: Anthony Bramley, Gosford House, Gosford, Kidlington, Oxfordshire; Robin J. T. Clabburn, 1, Stonefield Drive, Highworth, Wiltshire, both of England

[22] Filed: Mar. 25, 1975

[21] Appl. No.: 561,690

Related U.S. Application Data
[63] Continuation of Ser. No. 374,619, June 28, 1973, abandoned.

[30] Foreign Application Priority Data
July 7, 1972  United Kingdom............... 32024/72

[52] U.S. Cl................................. 428/107; 156/181; 156/244; 156/272; 264/DIG. 18; 264/22; 264/210 F; 428/198; 428/224
[51] Int. Cl.²............................................ B32B 5/12
[58] Field of Search .......... 156/166, 180, 181, 244, 156/245, 272; 264/DIG. 18, 22, 24, 176, 210, 290; 204/159.2; 428/107, 112, 113, 137, 224, 360, 198

[56] References Cited
UNITED STATES PATENTS

| | | |
|---|---|---|
| 3,003,304 | 10/1961 | Ole-Bendt Rasmussen .......... 264/22 |
| 3,081,571 | 3/1963 | Dayen et al...................... 204/159.2 |
| 3,097,150 | 7/1963 | Rainer et al. .................... 204/159.2 |
| 3,165,563 | 1/1965 | Ole-Bendt Rasmussen .......... 264/22 |
| 3,271,220 | 9/1966 | Geen.................................... 264/22 |
| 3,501,366 | 3/1970 | Bramley et al..................... 156/181 |

*Primary Examiner*—James J. Bell
*Attorney, Agent, or Firm*—Woodhams, Blanchard and Flynn

[57] ABSTRACT

Netting formed of longitudinal and transverse threads of thermoplastic material bonded at the thread crossings by individual moulded buttons of thermoplastic material is improved by the use of threads that have been subjected to irradiation to cross-link their thermoplastic material. Higher moulding temperatures can be used in the formation of the bonding buttons, for example in the case of polyethylene filaments up to 260° C or more, and increased bond strength between the crossing threads is achieved. The moulded buttons can also be formed of irradiated material.

11 Claims, 1 Drawing Figure

U.S. Patent  Sept. 28, 1976  3,983,280
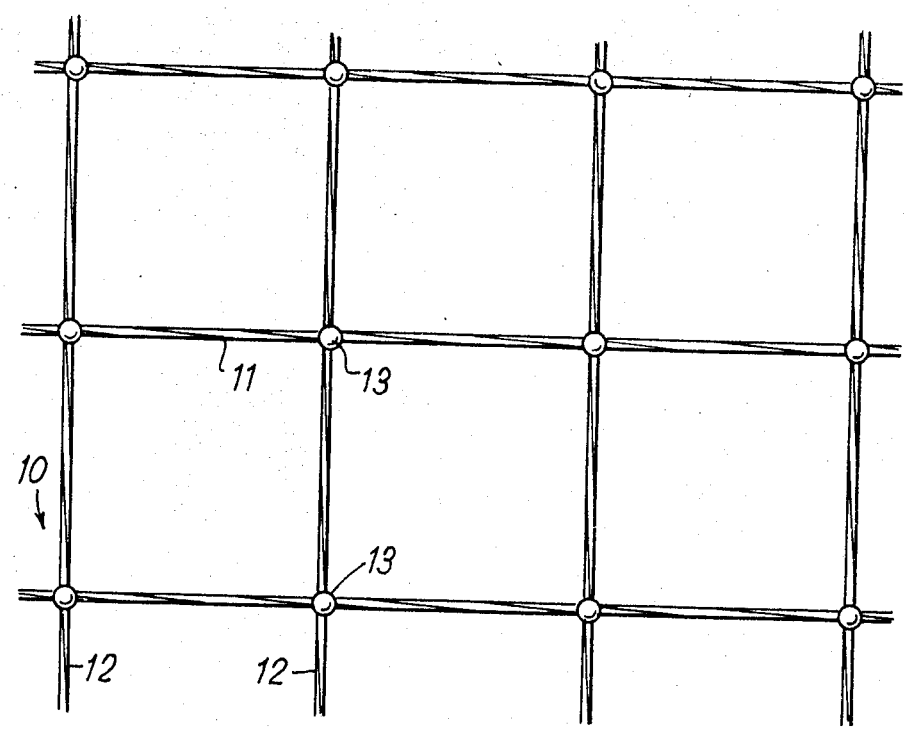

NETTING

This is a continuation of application Ser. No. 374,619, filed June 28, 1973, now abandoned.

This invention relates to the production of netting from threads comprising synthetic plastics material.

The specification of my British Patent No. 1,110,793 describes and claims netting suitable for making up into nets for conventional purposes, composed of regularly arranged flexible threads which consist of or contain thermoplastic filaments, the threads being joined to one another to form netting by masses of plastics material individually moulded and bonded to each thread at each thread junction. It also describes and claims a process for making netting in which an array of flexible transverse threads consisting of or containing thermoplastic filaments are laid across a plurality of flexible longitudinal threads consisting of or containing thermoplastic filaments, discrete masses of plastics material, in a heated condition are individually moulded about the threads at crossing points to secure the longitudinal to the transverse threads and the plastics mass is caused to harden and bond to the threads.

It is known for example from British Patent No. 990,325 to cross-link polymeric materials by irradiating them with high energy electrons or ionising radiation and that such cross-linked polymers have modified physical properties, such as increased heat resistance or a degree of dimensional stability and a potential of acquiring plastic memory.

It has now been found in accordance with one aspect of this invention that the use of threads comprising fibres or filaments of synthetic thermoplastic polymers which have been cross-linked by irradiation enables an improved quality of netting to be obtained. In particular, a bond of increased strength can be attained between crossing threads by the moulding technique described in the said specification.

Although the improvements which can be obtained by the use of the present invention in no way depend on any particular theory of operation, it is believed that during injection of the heated thermoplastic in moulding the bonding masses the plies of the twine employed tend to open or part, and thus allow the plastic material to penetrate more deeply among the constituent filaments of the threads. Moreover, the irradiated twine, with its enhanced heat resistance, can be bonded at a significantly higher temperature than untreated twine, without incurring heat damage or softening of the filaments, and the use of a higher moulding temperature gives a stronger bond. For example, for typical twine materials such as polyethylene, a moulding temperature of 235°–245° C with untreated twine can be safely increased to 255°–260° C for irradiated twine and in some cases even to 320° C.

The twine is preferably subjected to irradiation as a separate preliminary process before it is used for net making. Alternatively, twine can be made from filaments extruded from thermoplastic material and irradiated immediately after extrusion during filament manufacture. The irradiation dosage wll usually exceed 2 Mrads and is typically in the range 5 to 50 Mrads.

In accordance with a second aspect of this invention, the constituent threads of netting are secured together at the thread crossings by moulded masses of irradiated thermoplastic polymer. Such polymers can exhibit greater shrinkage on cooling than unirradiated polymers and, although this would ordinarily be regarded as a disadvantage by injection moulders, in the present instance the shrinkage results in a stronger bond between the crossing threads.

The invention will be further described, by way of example, with reference to the accompanying drawing, the single FIGURE of which shows netting produced in accordance with this invention.

The netting 10 shown in the drawing comprises longitudinal threads 11 in the form of twine of thermoplastic filaments, which in manufacture are drawn intermittently through respective moulding dies arranged in at least one transverse row, and transverse threads 12, also in the form of twine of thermoplastic filaments, which are drawn, singly or in groups corresponding to the rows of dies, across the longitudinal threads and through the moulding dies during each cycle of operation in manufacture. The threads are joined together at the crossings by individually moulded masses or buttons 13 of thermoplastic material, which may be chemically similar to the material of the threads, applied by injection moulding in the dies referred to. After the buttons 13 have been formed, the dies open and the longitudinal threads advanced until they reach the position where the next row or rows of thread junctions is or are to be formed.

This technique of manufacturing netting is described in greater detail in the aforementioned British Patent No. 1,110,793 and in the specification of our co-pending British Application No. 1,321,229.

In accordance with this invention, the longitudinal or transverse threads 11 or 12, and preferably both, which may for example be of polyethylene, are irradiated to cause cross-linking of their constituent material, for example by exposure to high energy electrons at a dose within the range 15 to 25 Mrads. The irradiation may be performed immediately after extrusion of the thermoplastic filaments or after their twisting into twine, or at any time before they are subjected to the operation of moulding the buttons 13.

The preferred practice of this invention and some of the advantages thereof will be illustrated by the following example.

EXAMPLE

Netting as shown in the drawing was produced in the manner described from high density polyethylene twine, irradiated to a dose of 20 Mrad. The bonding buttons were moulded also from high density polyethylene. Several samples of netting were made at different moulding temperatures.

The resulting netting was tested, in comparison with similar netting made from unirradiated twine, in a tensile testing machine to determine the force required to pull one single twine through a single button. The results are given in the following Table, where the force is indicated in comparative arbitrary units.

TABLE

|  | Moulding temperature, °C. | | | |
|---|---|---|---|---|
|  | 240 | 245 | 250 | 255 |
| Longitudinal threads: | | | | |
| Unirradiated | 30 | 29 | 32 | 32 |
| Irradiated | 56 | 63 | 65 | 69 |
| Transverse threads: | | | | |
| Unirradiated | 37 | 37 | 34 | 31 |
| Irradiated | 57 | 58 | 60 | 60 |

The results show that the bond strength of the samples made from irradiated twine is greater than those from unirradiated materials, and that increasing the moulding temperature increases the bond strength at the thread intersections.

The use of irradiated plastics materials for the filaments of the constituent threads or for the moulded bonding masses in the production of netting in accordance with British Patent No. 1,110,793 does not materially alter the observed contraction of the netting in the transverse or "weft" direction during manufacture, which is attributable to mechanical rather than physical causes. It does not therefore introduce additional problems, but the modified method and apparatus described in the specification of my application Ser. No. 1,321,229, which is intended to counteract the effects of such contraction and to facilitate the production of wider netting or the application of a plurality of rows of moulding masses in a single operation, can be used with equal advantage when irradiated polymers are employed in accordance with either aspect of the present invention.

What we claim is:

1. Netting comprising longitudinal threads of thermoplastic material and transverse threads of thermoplastic material joined together at the thread crossings by individually molded masses of plastic material, in which the material of the threads has been irradiated to cross-link such material prior to molding of the masses at the thread crossings and molding of such masses was carried out at a molding temperature above that at which softening or heat damage occurs in the same material not treated by irradiation but below a temperature damaging to the irradiated thread material.

2. Netting according to claim 1, in which the threads are formed of polyethylene filaments and the molding temperature was at least 225° C.

3. Netting according to claim 1, in which during molding of the masses the plies of the threads have been permitted to part for increased depth of penetration of the molding material among the constituent filaments of such threads.

4. A method of making netting by drawing transverse threads of synthetic thermoplastic polymer material across longitudinal threads of synthetic polymer material and bonding the threads together by moulding individual masses of thermoplastic polymer material at the thread crossings in which the improvement comprises subjecting the material of the threads to irradiation to cross-link the thermoplastic material thereof prior to the moulding of the masses at the thread crossings and thereby increasing the strength of bonding at the thread crossings.

5. A method according to claim 4 including forming the threads from polyethylene filaments subjected to a radiation dose of 15 to 25 Mrads and in which the moulding of the individual masses is conducted at a temperature of 255° to 260° C.

6. A method of making netting by drawing transverse threads of synthetic thermoplastic polymer material across longitudinal threads of synthetic thermoplastic polymer material and bonding the threads together by moulding individual masses of thermoplastic polymer material at thread crossings, in which the improvement comprises: subjecting the material of the threads to irradiation to cross-link the thermoplastic material thereof prior to the moulding of the masses at the thread crossings and thereby increasing the strength of bonding at the thread crossings, and setting the moulding temperature at a level above that at which softening or heat damage occurs in the same material untreated by irradiation but below a temperature damaging to the irradiated thread material, and thereby further increasing said bond strength.

7. In a method of making netting including the steps of drawing transverse threads of synthetic thermoplastic polymer material across longitudinal threads of synthetic thermoplastic polymer material, moulding individual masses of heated thermoplastic polymer material about the threads at their crossing points, and hardening the masses to bond same to said threads and thereby bonding the crossing threads together, increasing the strength of the bond between crossing threads by the additional steps comprising:
  irradiating the material of the threads to cross-link the thermoplastic material thereof prior to said step of moulding of the masses of the thread crossings, thereby increasing both said bond strength and the heat resistance of the thread material;
  setting the moulding temperature at a level above that at which bond strength for unirradiated threads of the same thermoplastic material starts to decrease from maximum, and thereby further increasing said bond strength; and
  increasing shrinkage of said masses upon cooling in said hardening step by irradiating the material of said masses prior to said moulding step, and thereby still further increasing said bond strength.

8. In a method of making netting including the steps of drawing transverse threads of synthetic thermoplastic polymer material across longitudinal threads of synthetic thermoplastic polymer material, moulding individual masses of heated thermoplastic polymer material about the threads at their crossing points, and hardening the masses to bond same to said threads and thereby bonding the crossing threads together, increasing the strength of the bond between crossing threads by the additional steps comprising:
  forming said thread from polyethylene filaments;
  irradiating the material of the threads to cross-link the thermoplastic material thereof prior to said step of moulding of the masses of the thread crossings, thereby increasing both said bond strength and the heat resistance of the thread material and in which the irradiation of the thread material is carried out with an irradiation dose of 15 – 25 MRADS;
  increasing shrinkage of said masses upon cooling in said hardening step by irradiating the material of said masses prior to said moulding step, and thereby still further increasing said bond strength.

9. A method according to claim 8 in which said threads consist of high density polyethylene twine and said bonding material comprises buttons of high density polyethylene, and including the steps of extruding thermoplastic filaments and twisting same into twine, said irradiation of thread material being performed after said extrusion, said moulding step having a maximum temperature limit of 320°C.

10. A method according to claim 6, in which the threads are formed of polyethylene filaments, and the moulding temperature is at least 255°C.

11. A method according to claim 10, in which the filaments of the threads are of high density polyethylene and are subjected to a radiation dosage of 15 to 25 Mrads in said irradiation prior to moulding.

* * * * *